(12) United States Patent
Fukui et al.

(10) Patent No.: US 10,543,561 B2
(45) Date of Patent: Jan. 28, 2020

(54) WELDING GUN

(71) Applicant: SMC CORPORATION, Chiyoda-ku (JP)

(72) Inventors: Chiaki Fukui, Abiko (JP); Kenichi Takeda, Noda (JP)

(73) Assignee: SMC CORPORATION, Chiyoda-ku (JP)

( * ) Notice: Subject to any disclaimer, the term of this patent is extended or adjusted under 35 U.S.C. 154(b) by 652 days.

(21) Appl. No.: 15/305,564

(22) PCT Filed: Mar. 16, 2015

(86) PCT No.: PCT/JP2015/057716
§ 371 (c)(1),
(2) Date: Oct. 20, 2016

(87) PCT Pub. No.: WO2015/170512
PCT Pub. Date: Nov. 12, 2015

(65) Prior Publication Data
US 2017/0036296 A1 Feb. 9, 2017

(30) Foreign Application Priority Data

May 8, 2014 (JP) ................................ 2014-096722

(51) Int. Cl.
*B23K 11/11* (2006.01)

(52) U.S. Cl.
CPC ..................... *B23K 11/11* (2013.01)

(58) Field of Classification Search
CPC ..... B23K 11/11; B23K 11/115; B23K 11/315; B23K 11/314; B23K 11/318
(Continued)

(56) References Cited

U.S. PATENT DOCUMENTS

| 4,410,782 A * | 10/1983 | Konno .................. B23K 11/314 |
| | | 219/86.25 |
| 9,409,282 B2 | 8/2016 | Fukui et al. |
| 2002/0157532 A1 * | 10/2002 | Weedon ................. B23K 11/31 |
| | | 92/51 |

FOREIGN PATENT DOCUMENTS

| JP | 6-70972 U | 10/1994 |
| JP | 9-248678 A | 9/1997 |

(Continued)

OTHER PUBLICATIONS

Korean Office Action dated Oct. 30, 2017 in Korean Patent Application No. 10-2016-7031227 (with English translation).
(Continued)

*Primary Examiner* — Dana Ross
*Assistant Examiner* — James F Sims, III
(74) *Attorney, Agent, or Firm* — Oblon, McClelland, Maier & Neustadt, L.L.P.

(57) ABSTRACT

A welding gun includes a driving-force transmission mechanism which converts linear displacement of an output unit of a driving unit into rotational displacement of a clamping arm. The driving-force transmission mechanism includes: an inclined part which is integrally displaced with the linear displacement of the output unit, and which is inclined with respect to the displacement direction of the output unit; and a part to be pressed which is pressed by the inclined part. The clamping arm rotates in accordance with movement of the part to be pressed which is pressed by the displaced inclined part, and generates clamping force.

2 Claims, 7 Drawing Sheets

(58) Field of Classification Search
USPC .............................. 219/86.25, 86.33, 86.61
See application file for complete search history.

(56) References Cited

FOREIGN PATENT DOCUMENTS

| | | |
|---|---|---|
| JP | 10-202370 A | 8/1998 |
| JP | 2001-198680 A | 7/2001 |
| JP | 2003-154465 A | 5/2003 |
| JP | 2004-351476 A | 12/2004 |
| JP | 2014-14913 A | 1/2014 |

OTHER PUBLICATIONS

International Search Report dated Jun. 16, 2015 in PCT/JP15/057716 Filed Mar. 16, 2015.
Combined Office Action and Search Report dated Jul. 15, 2019 in Indian Patent Application No. 201647034719, citing document AO therein, 6 pages.

* cited by examiner

WELDING GUN

TECHNICAL FIELD

The present invention relates to a welding gun provided with a clamping function and a welding function in combination.

BACKGROUND ART

In Japanese Laid-Open Patent Publication No. 09-248678, an X-type spot welding gun is disclosed, which opens and closes a movable side gun arm by a servo motor through a speed reducing device and a crank mechanism, and controls an output torque of the servo motor such that a pressing force applied during welding becomes constant, corresponding to a crank angle at a time that pressure is applied.

In Japanese Laid-Open Patent Publication No. 2001-198680, a structure is disclosed in which, in a resistance welding machine (welding gun) having an electrode tip operated by an air cylinder, the electrode tip is attached to the air cylinder through a holder. In the case of this structure, linear displacement of a piston rod of the air cylinder directly displaces the electrode tip without modification in a linear manner.

In Japanese Laid-Open Patent Publication No. 2004-351476, an air pressurization type welding device (welding gun) is disclosed in which a moving electrode is attached to an air cylinder through a shank. In the case of this structure as well, linear displacement of a piston rod of the air cylinder directly displaces the moving electrode without modification in a linear manner.

SUMMARY OF INVENTION

In Japanese Laid-Open Patent Publication No. 09-248678, because it is necessary to control the output torque of the servo motor such that the pressing force applied during welding becomes constant responsive to the crank angle at the time that pressure is applied, the control is complex. Further, according to Japanese Laid-Open Patent Publication No. 09-248678, because the crank mechanism is adopted as the power transmission mechanism, in order to keep the pressing force at the time of welding constant, there is a requirement to use a high output servo motor for generating the necessary maximum torque, and thus it is difficult to reduce the size and weight of the apparatus.

In the case of Japanese Laid-Open Patent Publication No. 2001-198680 and Japanese Laid-Open Patent Publication No. 2004-351476, because the driving force of the air cylinder is used without modification as the pressing force with respect to the workpiece, fixing of the workpiece solely by the welding gun is difficult. Consequently, in order to securely fix the workpiece, a clamping device for gripping the workpiece is needed separately from the welding gun. Further, in order to increase the pressing force, it is necessary to increase the output of the air cylinder, and when this is done, the air cylinder becomes larger in scale and increases in weight.

The present invention has been devised taking into consideration the aforementioned problems, and has the object of providing a welding gun in which a separate clamping device is unnecessary, which is capable of clamping a workpiece with a substantially constant clamping force over the entire region of a clamping force generating range, and which enables the device to be made small in size and lightweight.

In order to achieve the aforementioned objects, a welding gun according to the present invention includes a body, a clamp arm configured to be rotated with respect to the body, a drive unit configured to drive the clamp arm, and having an output unit configured to be displaced linearly, a driving force transmission mechanism configured to convert linear displacement of the output unit into rotational displacement of the clamp arm, and transmit a driving force of the drive unit to the clamp arm, a first electrode fixed to the clamp arm, and a second electrode configured to grip a workpiece between the first electrode and the second electrode, wherein the driving force transmission mechanism includes an inclined section configured to be displaced integrally with linear displacement of the output unit, the inclined section being inclined with respect to a displacement direction of the output unit, and a pressed member configured to be pressed by the inclined section, wherein the clamp arm rotates accompanying movement of the pressed member, which is pressed by the inclined section during displacement of the inclined section, and generates a clamping force.

In accordance with the welding gun of the present invention, which is constituted in the manner described above, the workpiece can be clamped between the electrodes at a predetermined clamping force, and electric current can be supplied to the workpiece for welding the workpiece. Consequently, without separately providing a clamping device, and only with the welding gun, it is possible to realize both clamping and welding of the workpiece. Thus, it is possible to reduce equipment costs, and welding with respect to a comparatively small-sized workpiece can easily be implemented. Further, according to the welding gun of the present invention, since welding can be carried out simultaneously with clamping of the workpiece, compared to the case of using a welding gun and a clamping device in the form of separate structures, it is possible to reduce the cycle time.

Further, according to the welding gun of the present invention, the clamp arm to which the first electrode is attached undergoes rotation accompanying movement of the pressed member that is pressed by the linearly displaced inclined section, and generates the clamping force. Thus, it is possible to generate a substantially constant clamping force over roughly the entire region of a clamping force generating range. Consequently, even in the case of a change in the workpiece thickness or if wearing of the electrodes occurs, the workpiece can be clamped at a substantially constant clamping force within a certain tolerance range, without requiring positional adjustments or replacement of component parts.

Furthermore, in accordance with the welding gun of the present invention, with a process of converting linear displacement of the output unit of the drive unit into rotational displacement of the arm, by the pressing action, i.e., a wedge action, of the inclined section with respect to the pressed member, the driving force of the drive unit is increased over roughly the entire region of the clamping force generating range. Consequently, since the required clamping force can be produced merely by a small driving force of the drive unit, a small scale and lightweight drive unit can be adopted. Thus, in accordance with the welding gun of the present invention, while having both functions of a clamping device and a welding device, a reduction in size and weight can be realized.

In the above-described welding gun, the output unit may be a piston rod, and the drive unit may include a plurality of pistons that are fixed on the piston rod and arranged at intervals therebetween in an axial direction of the piston rod.

In the above-described welding gun, the driving force transmission mechanism may further include a joint, which is connected to the output unit and has the inclined section formed thereon, and a link arm configured to be displaced in a direction that intersects the displacement direction of the output unit, the link arm being supported rotatably with respect to the joint. In addition, operations of the welding gun may include a first operation by which linear displacement of the joint is converted into rotational displacement of the clamp arm through the link arm, and is transmitted, and a second operation by which linear displacement of the joint is converted into rotational displacement of the clamp arm through the inclined section and the pressed member, and is transmitted.

In accordance with the welding gun of the present invention, a separate clamping device is unnecessary, the workpiece can be clamped with a substantially constant clamping force over the entire region of a clamping force generating range, and further, the device can be made small in size and lightweight.

The above and other objects, features and advantages of the present invention will become more apparent from the following description when taken in conjunction with the accompanying drawings, in which preferred embodiments of the present invention are shown by way of illustrative example.

DESCRIPTION OF EMBODIMENTS

A preferred embodiment concerning a welding gun according to the present invention will be described with reference to the accompanying drawings.

First Embodiment

Figure 1:
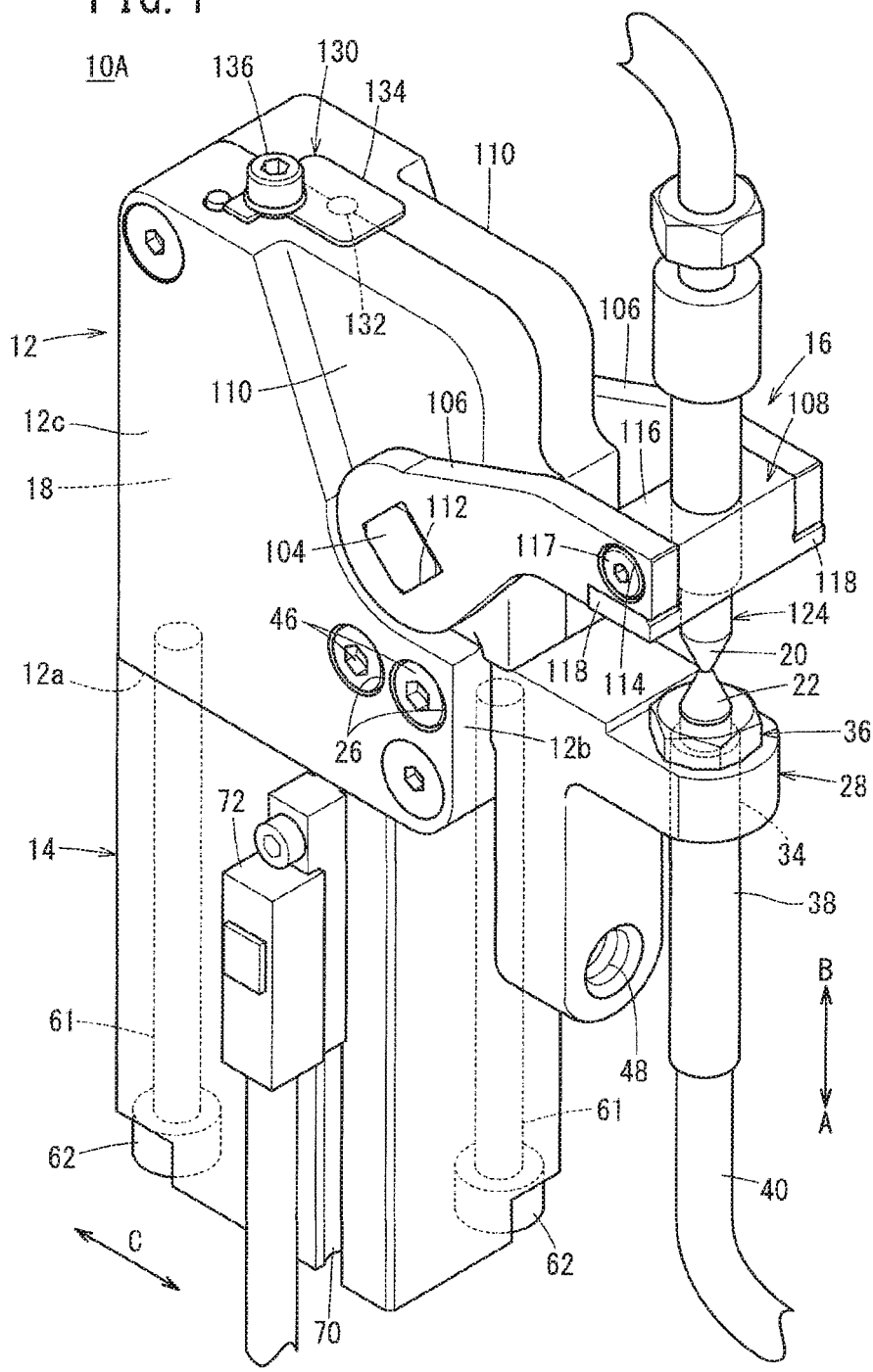
FIG. 1 is a perspective view of a welding gun according to a first embodiment of the present invention.
Figure 2:
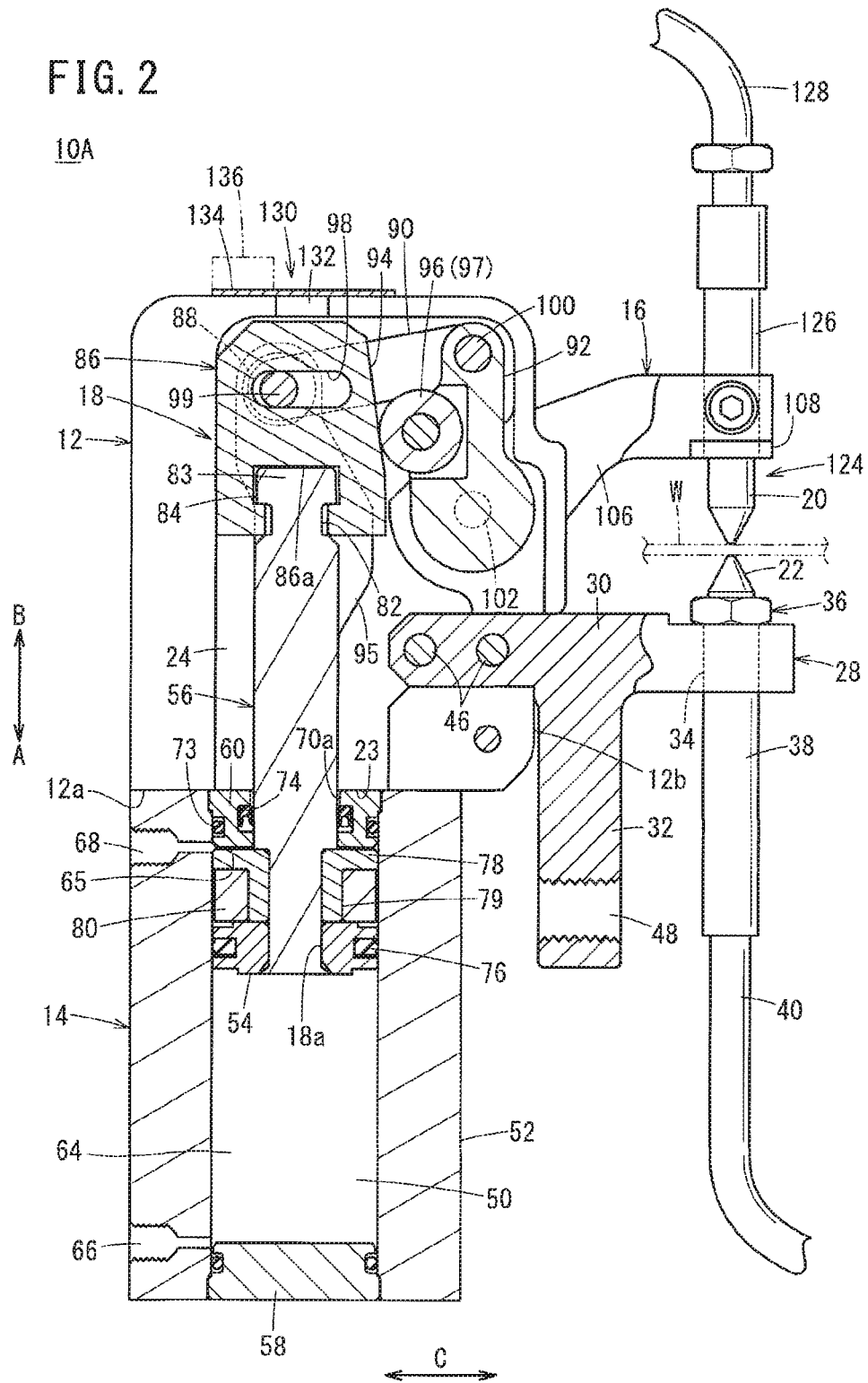
FIG. 2 is a partial cross-sectional view of the welding gun shown in FIG. 1 at a time of clamping.
Figure 3:
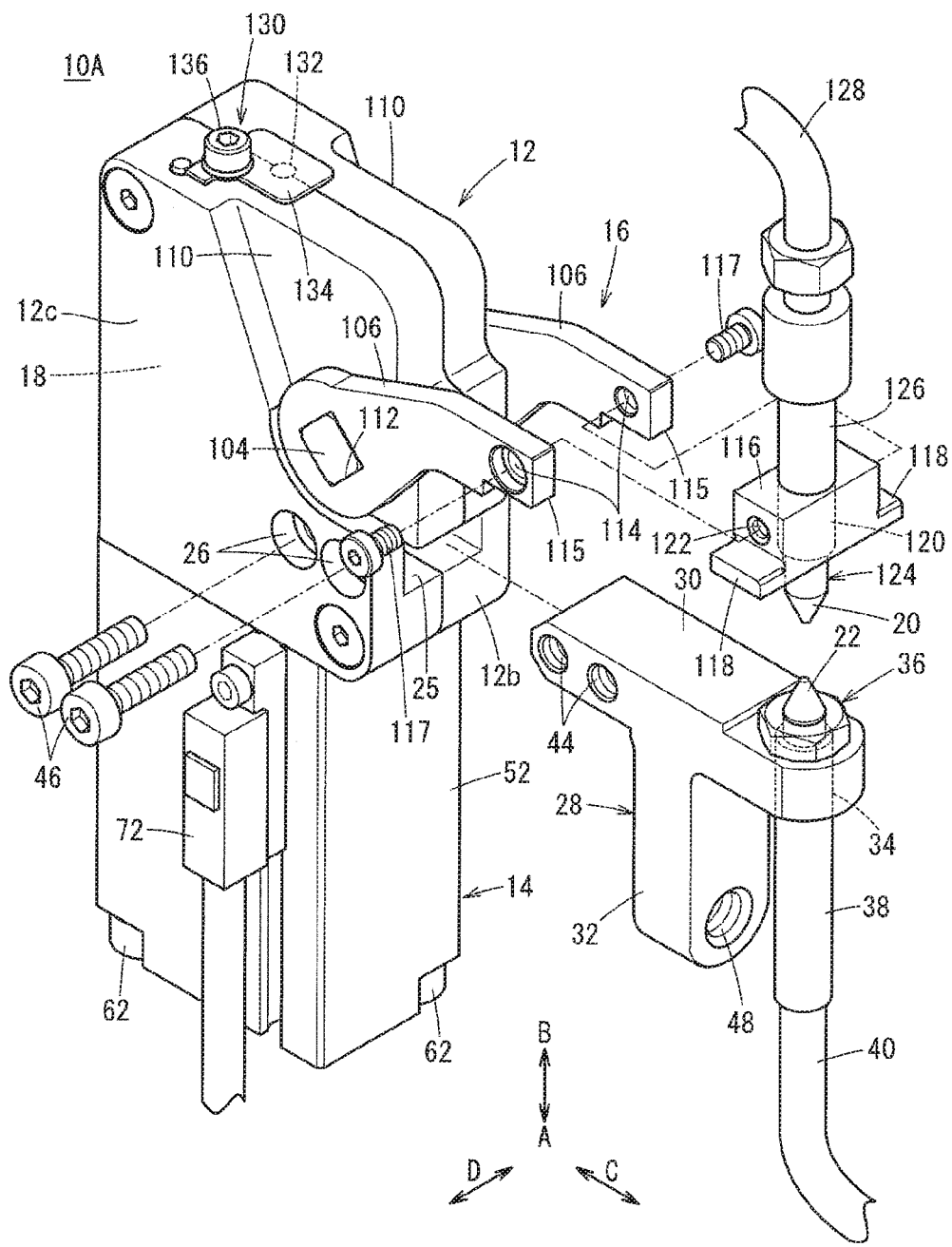
FIG. 3 is an exploded perspective view of the welding gun shown in FIG. 1.

FIG. 1 is a perspective view of a welding gun 10A according to a first embodiment of the present invention. FIG. 2 is a partial cross-sectional view of the welding gun 10A at a time of clamping. FIG. 3 is an exploded perspective view of the welding gun 10A.

The welding gun 10A includes a hollow body 12, a drive unit 14 provided on an end of the body 12, a clamp arm 16 disposed rotatably with respect to the body 12, a driving force transmission mechanism 18 that transmits, to the clamp arm 16, a driving force along an axial direction (indicated by arrows A and B) of the drive unit 14, a movable side electrode 20 (first electrode) attached to the clamp arm 16, and a stationary side electrode 22 (second electrode) that grips a workpiece W between the movable side electrode 20 and the stationary side electrode 22.

The body 12, for example, is formed with a substantially rectangular shape in cross section with a predetermined width dimension, and an accommodating chamber 24 is formed in the interior thereof. The accommodating chamber 24 opens at an opening 23 provided on one end (an end surface 12a on the side of the arrow A) of the body 12, and the drive unit 14 is connected thereto so as to close the opening 23. On a side surface 12b substantially perpendicular to the opening 23, a connecting hole 25 opens that communicates with the accommodating chamber 24, and to which a support body 28 is connected. The driving force transmission mechanism 18 is accommodated in the accommodating chamber 24. As shown in FIG. 3, in the body 12, a pair of bolt holes 26 are formed on a side surface 12c substantially perpendicular to the opening direction of the connecting hole 25.

The support body 28, which is substantially T-shaped in cross section, is disposed detachably on the side surface 12b of the body 12. The support body 28 is provided so as to project in a sideways direction with respect to the side surface 12b of the body 12, and includes a support member 30 which projects in a horizontal direction (the directions of the arrow C) with respect to the body 12, and an attachment section 32 that extends downward (in the direction of the arrow A) substantially perpendicular to the support member 30.

The support member 30, for example, is formed in a straight line shape with a predetermined length. An electrode unit 36 is fixed detachably to the support member 30 through an attachment hole 34 that is formed in one end portion of the support member 30. The electrode unit 36 includes a stationary side electrode 22, and an electrode holder 38 that retains the stationary side electrode 22. One end of an energizing cable 40 is connected to the electrode unit 36. The stationary side electrode 22 is disposed so as to project upwardly (in the direction of the arrow B) from the support member 30.

A pair of threaded holes 44 for fixing, which open in a sideways direction, are formed in the other end of the support member 30 (see FIG. 3). More specifically, the threaded holes 44 for fixing are formed substantially perpendicular to the attachment hole 34. In an assembly step, after the other end of the support member 30 has been inserted into the connecting hole 25 that opens on the side surface 12b of the body 12, fixing screws 46 are inserted through the bolt holes 26 of the body 12 and screw-engaged in the threaded holes 44 for fixing, whereby the support body 28 is fixed with respect to the body 12.

The attachment section 32, for example, is formed on a substantially central part of the support member 30 along a longitudinal direction (the directions of the arrow C) of the support member 30, and is formed so as to project at a predetermined length in a direction opposite to the clamp arm 16 (in the direction of the arrow A) with respect to the support member 30. A threaded hole 48 for attachment, which penetrates substantially in parallel with the support member 30, is formed in an end of the attachment section 32. The threaded hole 48 for attachment is provided for the purpose of being fixed to another member, when the welding gun 10A is used on a production line or the like.

As shown in FIG. 2, the drive unit 14, for example, includes a tubular shaped cylinder tube 52 in which a cylinder hole 50 is formed that penetrates in the axial direction (the direction of arrows A and B), a piston 54 disposed displaceably in the axial direction in the interior (the cylinder hole 50) of the cylinder tube 52, a piston rod 56 connected to the piston 54, a cap 58 disposed on one end (a lower end as shown in FIG. 2) of the cylinder hole 50, and a rod cover 60 provided on the other end (the upper end as shown in FIG. 2) of the cylinder hole 50, and which displaceably supports the piston rod 56.

The cylinder tube 52 is disposed such that one end thereof abuts against an end surface of the body 12. As shown in FIG. 1, in the cylinder tube 52, a pair of through holes 61 are formed that penetrate in the axial direction. The drive unit 14 is connected with respect to the body 12 by screw-engagement of fastening bolts 62, which are inserted through the through holes 61, with respect to the body 12.

The plate shaped cap 58, for example, is mounted in an airtight manner in the one end (the end on the side of the arrow A) of the cylinder hole 50, thereby closing the one end of the cylinder hole 50. The rod cover 60 is mounted in an airtight manner in the other end (the end on the side of the arrow B) of the cylinder hole 50, thereby closing the other end of the cylinder hole 50. In the cylinder hole 50, a first pressure chamber 64 is formed between the piston 54 and the cap 58, and a second pressure chamber 65 is formed between the piston 54 and the rod cover 60.

As shown in FIG. 2, a clamping port 66 and an unclamping port 68, to and from which a pressure fluid (gas or liquid) is supplied and discharged, are formed on one side surface of the cylinder tube 52, perpendicularly to the axial direction of the cylinder tube 52.

A fluid path switching device, which switches the supply state of the pressure fluid, for example, through non-illustrated piping or the like, is connected to the clamping port 66 and the unclamping port 68. In addition, by selectively supplying the pressure fluid to the clamping port 66 and the unclamping port 68, the piston 54 and the piston rod 56 are driven in the axial direction. More specifically, in order to perform clamping, the pressure fluid is supplied to the clamping port 66, and in order to perform unclamping, the pressure fluid is supplied to the unclamping port 68.

The clamping port 66 communicates with the first pressure chamber 64, and the unclamping port 68 communicates with the second pressure chamber 65. Accordingly, the pressure fluid supplied to the clamping port 66 is introduced to the first pressure chamber 64. Further, the pressure fluid supplied to the unclamping port 68 is introduced to the second pressure chamber 65.

As shown in FIG. 1, sensor attachment grooves 70 that extend along the axial direction are formed on respective side surfaces of both sides of the cylinder tube 52 in the widthwise direction (the direction of the arrow D) of the cylinder tube 52. Magnetic sensors 72 are mounted detachably in the sensor attachment grooves 70. It is noted that, in FIG. 1, one sensor attachment groove 70 is formed in each of the side surfaces of the cylinder tube 52, however, multiple sensor attachment grooves 70 may be formed in each of the side surfaces.

The rod cover 60 shown in FIG. 2 is an annular member which is fixed to the other end of the cylinder hole 50, and on the inner circumference thereof, the piston rod 56 is supported displaceably in the axial direction. By an outer side sealing ring 73, which is disposed on the outer circumference of the rod cover 60, leakage of pressure fluid to the exterior through a gap between the rod cover 60 and the cylinder tube 52 (the inner circumferential surface of the cylinder hole 50) is prevented.

The piston rod 56 is inserted through a rod hole 70*a*, which is formed to penetrate in the axial direction in the center of the rod cover 60. By an inner side sealing ring 74, which is disposed on the inner circumference of the rod cover 60, leakage of pressure fluid to the exterior through a gap between the rod cover 60 and the piston rod 56 is prevented.

The piston 54 is a hollow member having a rod hole 18*a* therein. The piston 54 is fixed to one end side of the piston rod 56 by a suitable fixing means such as crimping or a bolt or the like. By an annular packing 76, which is mounted on the outer circumference of the piston 54, leakage of pressure fluid to the exterior through a gap between the piston 54 and the cylinder tube 52 (the inner circumferential surface of the cylinder hole 50) is prevented.

Further, a magnet holder 78 is arranged adjacent to the piston 54 on the piston rod 56. A magnet 80 is installed in an annular magnet groove 79 formed in the magnet holder 78. During use of the welding gun 10A, by detecting magnetism of the magnet 80 by the magnetic sensors 72 that are attached to the cylinder tube 52, the position of the piston 54 in the axial direction can be detected.

The piston rod 56 is supported by the rod cover 60 so as to be capable of moving reciprocally in the axial direction (the direction of arrows A and B). On the other end of the piston rod 56 (an end on an opposite side from the side to which the piston 54 is connected), a connecting section 84 is formed having a neck portion 82, which is recessed in an annular shape, and an expanded diameter portion 83, which is expanded in diameter with respect to the neck portion 82 and is formed on the distal end. The neck portion 82 and the expanded diameter portion 83 are formed with circular shapes in cross section having different diameters, respectively.

As shown in FIG. 2, the driving force transmission mechanism 18 is disposed in the accommodating chamber 24 of the body 12, and includes a joint 86 which is connected to the other end of the piston rod 56, a pair of guide rollers 88 which are disposed rotatably on an upper part of the joint 86, a link arm 90 that is pivotally supported on the joint 86 together with the guide rollers 88, and a lever arm 92 that interconnects the link arm 90 and the clamp arm 16.

The joint 86 is formed with a substantially rectangular shape in cross section, with a connecting recess 86*a* to which the connecting section 84 of the piston rod 56 is connected being formed on a lower end thereof. The connecting recess 86*a* is formed to open on an end surface side (in the direction of the arrow A) and one side surface side of the joint 86, and is made up from a small diameter portion, which is formed on the end surface side, and a large diameter portion.

In addition, when the other end portion of the piston rod 56 is connected to the connecting recess 86*a* of the joint 86, the neck portion 82 of the piston rod 56 engages with the small diameter portion of the connecting recess 86*a*, whereas the expanded diameter portion 83 of the piston rod 56 engages with the large diameter portion thereof.

On the other hand, as shown in FIG. 2, on an upper portion of the joint 86, on a side surface facing toward the clamp arm 16, an inclined section 94 is formed. The inclined section 94 is inclined with respect to the direction of displacement (the axial direction) of the piston rod 56, and is formed in a tapered shape tapering gradually toward the upper end. A pressed member 96, which is disposed on the lever arm 92, abuts against the inclined section 94 when the clamp arm 16 is rotated from the unclamped state (see FIG. 4) to the clamp state (see FIG. 2).

The guide rollers 88 are guided along a vertical direction (the direction of arrows A and B) when the joint 86 moves, as a result of being arranged in a roller groove 95 that is formed along the axial direction on an inner surface of the body 12.

A link groove 98, which extends in a direction perpendicular to the axial direction of the drive unit 14 (in the directions of the arrow C), is formed in the joint 86. The guide rollers 88 and the link arm 90 are supported rotatably in the joint 86 through a shaft member 99 that is arranged in the link groove 98. The shaft member 99 is capable of moving inside the link groove 98 along the directions of the arrow C. Consequently, the guide rollers 88 and one end of the link arm 90 are movable by a predetermined distance in the directions of the arrow C.

The link arm 90 is capable of being displaced in a direction intersecting the displacement direction of the piston rod 56 (in the present embodiment, a direction perpendicular to the displacement direction of the piston rod 56), and is supported rotatably with respect to the joint 86. The link arm 90 is connected between an upper part of the joint 86 and the lever arm 92. The link arm 90 and the lever arm 92 are rotatable mutually through a link pin 100. The link arm 90 converts the linear motion of the piston rod 56 into rotational motion of the clamp arm 16 through the joint 86.

The lever arm 92 is supported rotatably in the body 12 through a shaft member 102, together with interconnecting the link arm 90 and one end of the clamp arm 16. The pressed member 96 is disposed midway along the lever arm 92. More specifically, in the present embodiment, the pressed member 96 is a sub-roller 97 that is supported rotatably on the lever arm 92.

The sub-roller 97 is a member that is pressed by the inclined section 94 provided on the joint 86, and rotates by abutting against the inclined section 94 accompanying displacement of the joint 86 in the axial direction. The lever arm 92 and the clamp arm 16 are connected to each other through engagement pins 104, which are rectangular in cross section (see FIG. 1), so that the lever arm 92 and the clamp arm 16 are incapable of rotating relative to each other.

In the aforementioned manner, the clamp arm 16 is connected in a non-rotatable manner with respect to the lever arm 92 together with being supported rotatably with respect to the body 12. Further, the pressed member 96, which is pressed by the inclined section 94, is disposed on the lever arm 92. Due to this structure, the clamp arm 16 undergoes rotation accompanying movement of the pressed member 96 that is pressed by the inclined section 94, which is displaced integrally with the piston rod 56, and thereby generates a clamping force.

As shown in FIGS. 1 through 3, for example, the clamp arm 16 includes a pair of arm members 106 that are arranged on both sides of the body 12, and a connecting body 108 that connects the other ends of the arm members 106. The clamp arm 16 exhibits a U-shape in cross section.

Ends of the arm members 106 (ends on the side of the center of rotation) are accommodated in recesses 110, which are formed respectively on both side surfaces perpendicular to the one side surface and the other side surface of the body 12. The recesses 110 are formed by being inwardly recessed by an amount corresponding to the thickness of the arm members 106 with respect to the both side surfaces of the body 12. Therefore, the arm members 106 are accommodated without projecting outwardly from both side surfaces of the body 12. The arm members 106 are arranged so as to face each other and in parallel to each other at a given interval on both sides of the body 12.

As shown in FIG. 3, supporting holes 112 in which cross-sectionally rectangular shaped engagement pins 104 are inserted are formed on the ends of the arm members 106. On other ends of the arm members 106, insertion holes 114 are formed that penetrate in the thickness direction.

The connecting body 108 is made up from a block-shaped body that is substantially rectangular in cross section. The connecting body 108 includes a main body portion 116, and a pair of flanges 118 that project out respectively in a width direction with respect to the main body portion 116. An attachment hole 120 is formed along a direction perpendicular to the width direction in the main body portion 116, and fixing screw holes 122 are formed in both side surfaces of the main body portion 116 that face toward the arm members 106.

The main body portion 116 is arranged between the two arm members 106, and together therewith, in a state in which the flanges 118 are disposed on stepped parts 115 that are formed on the distal ends of the arm members 106, fixing screws 117, which are inserted through the insertion holes 114 of the arm members 106, are screw-engaged respectively in the fixing screw holes 122. Owing thereto, the connecting body 108 is connected integrally between the pair of arm members 106. When the fixing screws 117 are loosened, the connecting body 108 can be taken out from the arm members 106. In other words, the connecting body 108 is attachable and detachable with respect to the arm members 106.

An electrode unit 124 is fixed detachably to the connecting body 108 through the attachment hole 120. The electrode unit 124 includes a movable side electrode 20, and an electrode holder 126 that retains the movable side electrode 20. One end of an energizing cable 128 is connected to the electrode unit 124. The movable side electrode 20 is disposed so as to project from the connecting body 108.

The stationary side electrode 22 and the movable side electrode 20 are disposed so as to be face-to-face with each other at a time of clamping the workpiece W, as shown in FIG. 2. Consequently, in the clamped state in which the clamp arm 16 is rotated by a predetermined angle, the workpiece W is clamped between the stationary side electrode 22 and the movable side electrode 20.

As shown in FIGS. 1 through 3, a clamp release mechanism 130 may be provided on the welding gun 10A. The clamp release mechanism 130 includes a hole 132 therein that penetrates to the interior of an upper portion of the body 12, and an opening/closing lid 134 that is capable of closing the hole 132.

With the clamp release mechanism 130, the hole 132 is formed to penetrate through the body 12 in facing relation to an upper surface of the joint 86, whereby it is possible for a non-illustrated operator to press the joint 86 with a jig or the like through the hole 132 and toward the drive unit 14 (in the direction of the arrow A).

The opening/closing lid 134 is formed, for example, in a substantially rectangular shape, and a corner thereof is supported by a lid retaining bolt 136 with respect to an upper surface of the body 12, whereby the opening/closing lid 134 is rotatable about the lid retaining bolt 136 which acts as a fulcrum or support point. In the event that the clamp release mechanism 130 is not being used, by closing the hole 132 by means of the opening/closing lid 134, dust and spatter or the like are prevented from entering into the interior of the body 12 through the hole 132. On the other hand, by moving the opening/closing lid 134 and opening the hole 132, it is possible to perform an action to release the clamped state through the hole 132.

The welding gun 10A according to the present embodiment is constituted basically as has been described above.

Next, operations and advantageous effects of the welding gun 10A will be described. In the following description, the unclamped state shown in FIG. 4 will be described as an initial position.

In the initial position of the welding gun 10A, a pressure fluid is supplied to the unclamping port 68, and by the piston 54 descending, the clamp arm 16 is separated in a substantially perpendicular orientation with respect to the support body 28 through the driving force transmission mechanism 18.

Figure 4:
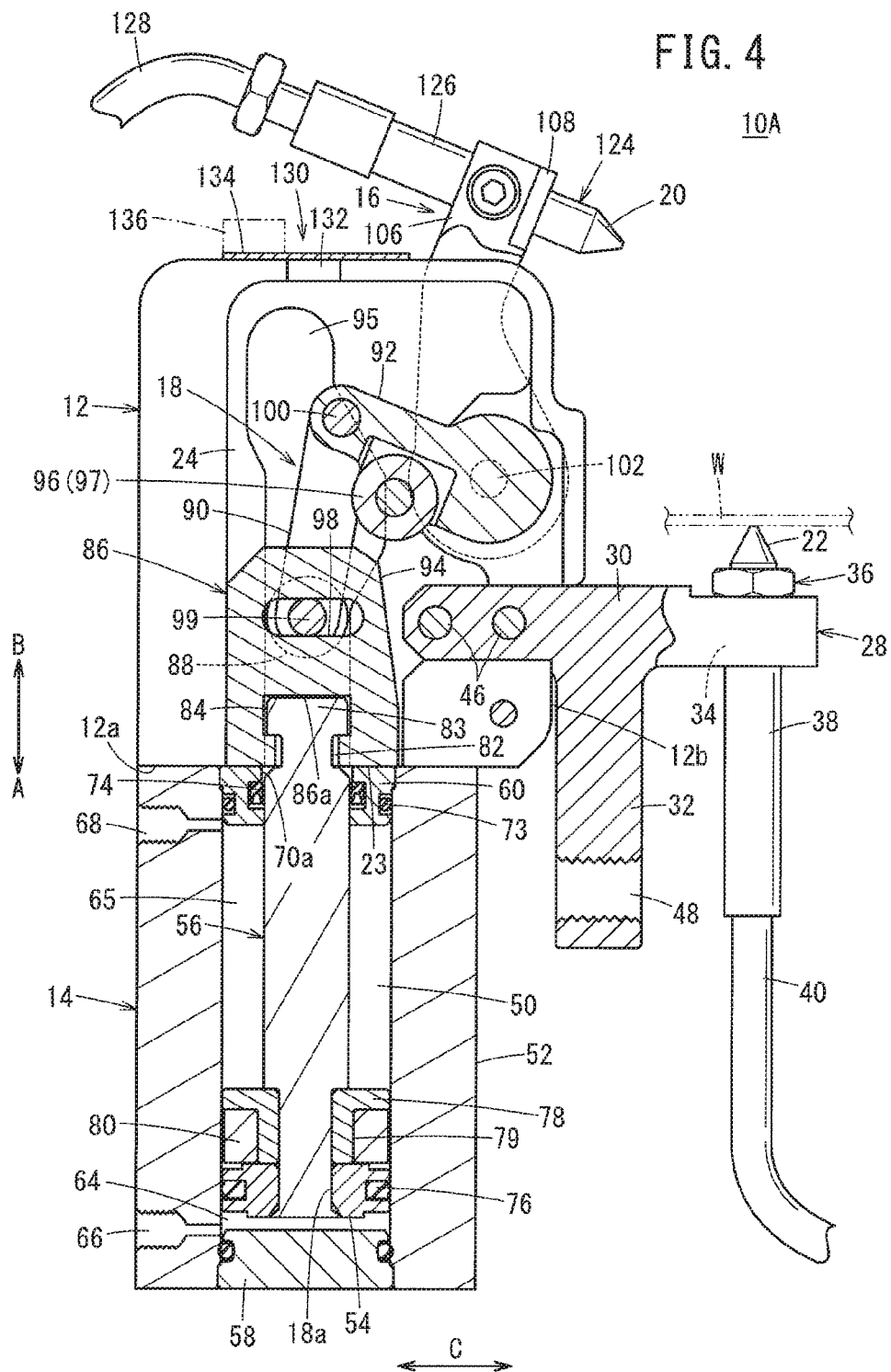
FIG. 4 is a partial cross-sectional view of the welding gun shown in FIG. 1 at a time of unclamping.

At first, from the initial position of the welding gun 10A shown in FIG. 4, under a switching action of a non-illustrated switching device, the pressure fluid is supplied to the clamping port 66, and the unclamping port 68 is placed in a condition of being open to atmosphere.

Consequently, the piston 54 is pressed toward the side of the body 12 (in the direction of the arrow B) by the pressure fluid that is introduced into the first pressure chamber 64 from the clamping port 66, whereupon the piston 54 and the piston rod 56 are displaced integrally toward the side of the body 12.

Along with displacement of the piston rod 56, under a guiding action of the guide rollers 88 with respect to the roller groove 95, the joint 86 is moved in a direction away from the drive unit 14 (in the direction of the arrow B). Further, accompanying movement of the joint 86, the link arm 90 starts to move in the direction of the arrow B while being rotated in a clockwise direction in FIG. 4 about a site where it is pivotally supported on the joint 86. Accompanying movement of the link arm 90, the lever arm 92 is rotated, and by rotation of the lever arm 92, the clamp arm 16 is rotated clockwise about the shaft member 102 (first operation).

In addition, when the joint 86 moves further in the direction of the arrow B accompanying the displacement of the piston rod 56, before long, the sub-roller 97 comes into abutment against the inclined section 94 of the joint 86. By the inclined section 94 that is displaced, the sub-roller 97 is pressed, and accordingly, the clamp arm 16 connected to the lever arm 92 is rotated in a closing direction with respect to the support member 30 (second operation). Consequently, as shown in FIG. 2, the movable side electrode 20 attached to the clamp arm 16 comes into abutment against the workpiece W, and a clamped state is brought about in which the workpiece W is gripped between the stationary side electrode 22 and the movable side electrode 20.

In the foregoing manner, the operations of the welding gun 10A when the clamp arm 16 is to be closed include the first operation by which linear displacement of the joint 86 is converted into rotational displacement of the clamp arm 16 through the link arm 90, and is transmitted, and the second operation by which linear displacement of the joint 86 is converted into rotational displacement of the clamp arm 16 through the inclined section 94 and the pressed member 96, and is transmitted. The welding gun 10A generates a clamping force within the range of the second operation in which the clamp arm 16 is made to rotate under the action of the inclined section 94 and the pressed member 96.

In addition, after the workpiece W has been clamped between the stationary side electrode 22 and the movable side electrode 20, under a condition that the clamped state is maintained, supply of electric current through the workpiece W, i.e., energizing of the workpiece W, is carried out for a predetermined time period through the stationary side electrode 22 and the movable side electrode 20, whereby spot welding occurs at the energized location of the workpiece W.

In this case, for example, the thickness of the workpiece W is 0.2 mm or less (preferably, 0.15 to 0.2 mm), the clamping force is on the order of 100 N (preferably, 90 to 110 N), the welding current is 2500 to 4000 A, the welding voltage is 6.3 to 10 V, and the welding time is 20 to 80 ms.

After welding, in the case that the clamped state of the workpiece W shown in FIG. 2 is to be released, under a switching action of a non-illustrated switching device, the pressure fluid that has been supplied to the clamping port 66 is supplied to the unclamping port 68, and the clamping port 66 is placed in a condition of being open to atmosphere. By the pressure fluid that is supplied to the unclamping port 68 being introduced to the second pressure chamber 65, the piston 54 is pressed in a direction away from the body 12 (in the direction of the arrow A), whereupon the piston rod 56 is retracted integrally together with the piston 54.

In addition, along with displacement of the piston rod 56, under a guiding action of the guide rollers 88 with respect to the roller groove 95, the joint 86 is moved in a direction toward the cylinder tube 52, and along therewith, the link arm 90 is rotated in a counterclockwise direction in FIG. 2 about the site where it is pivotally supported on the joint 86. Along therewith, the clamp arm 16 is rotated, via the lever arm 92, counterclockwise in FIG. 2 by a predetermined angle about the shaft member 102. Consequently, the clamp arm 16 separates away from the support body 28, and the clamped state of the workpiece W is released.

Corresponding to a change in the shape of the workpiece W to be clamped, the support body 28 and the clamp arm 16 in the welding gun 10A may be exchanged. For example, in the case that a larger workpiece W is to be clamped and welded by the welding gun 10A, the support body 28 and the clamp arm 16 are removed from the body 12, another support body and another clamp arm, which are larger (longer) than the support body 28 and the clamp arm 16, may be connected to the body 12.

In accordance with the welding gun 10A of the present invention, which is constituted in the manner described above, the workpiece W can be clamped between the electrodes at a predetermined clamping force, and electric current can be supplied to the workpiece W for welding the workpiece W. Consequently, without separately providing a clamping device, and only with the welding gun 10A, it is possible to realize both clamping and welding of the workpiece W. Thus, it is possible to reduce equipment costs, and welding with respect to a comparatively small-sized workpiece W can easily be implemented. Further, according to the welding gun 10A, since welding can be carried out simultaneously with clamping of the workpiece W, compared to the case of using a welding gun and a clamping device in the form of separate structures, it is possible to reduce the cycle time.

Figure 5:
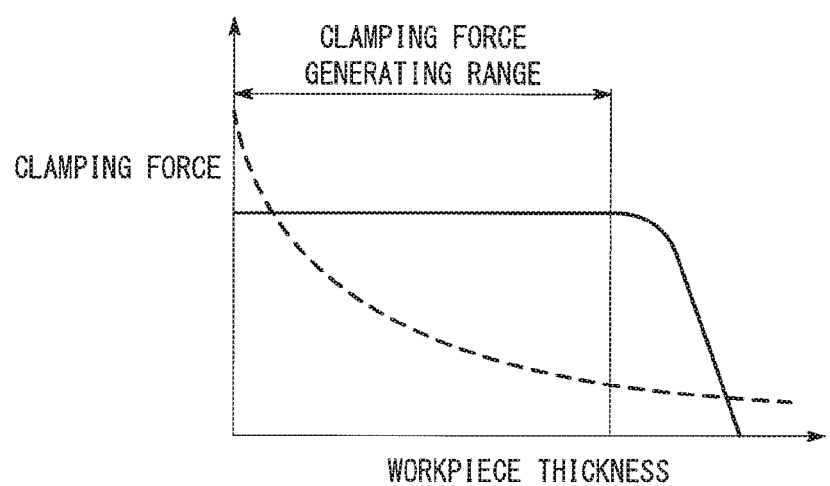
FIG. 5 is a graph that shows clamping force characteristics of the welding gun shown in FIG. 1.

FIG. 5 is a graph that shows clamping force characteristics (a relationship between the workpiece thickness and the clamping force) of the welding gun 10A according to the present embodiment. As in the characteristic curve shown by the solid line in FIG. 5, in the case of the welding gun 10A, which generates a clamping force by a wedge action of the inclined section 94, inside of the clamping force generating range, the clamping force is substantially constant. More specifically, the clamp arm 16 to which the movable side electrode 20 is attached undergoes rotation accompanying movement of the pressed member 96 that is pressed by the linearly-displaced inclined section 94, and the clamp arm 16 generates the clamping force by such a wedge action. Thus, it is possible to generate a substantially constant clamping force over roughly the entire region of the clamping force generating range.

Consequently, according to the welding gun 10A, the allowable range or tolerance, which is compatible with respect to the workpiece thickness and the amount of electrode wear, is wide. Therefore, even in the case of a change in the workpiece thickness or if wearing of the electrodes 20, 22 occurs, the workpiece W can be clamped at a substantially constant clamping force within the allowable range, without requiring positional adjustments of component parts (positional adjustments of the electrode units 36, 124) or replacement of component parts (replacement of the electrodes 20, 22, etc.). Further, in accordance with the welding gun 10A, since within the clamping force generating range, the clamping force with respect to the workpiece thickness remains substantially constant, it is easy to obtain stable welded products, together with enabling an extension in the useful life of the electrodes 20, 22.

In contrast thereto, in the case of a structure in which the clamping force is generated by a toggle link mechanism as the power transmission mechanism, as in the characteristic curve shown by the dashed line in FIG. 5, the clamping force changes significantly over the clamping force generating range. More specifically, the clamping force with respect to the workpiece thickness is not constant. Therefore, the clamping force varies due to the workpiece thickness and the state of wear of the electrodes 20, 22, and a variance in welding tends to occur. As a result, it is unlikely for stabilized welded products to be obtained. Alternatively, in order to keep the clamping force constant, it is necessary to exchange the electrodes or to make positional adjustments of component parts responsive to the workpiece thickness or the state of wear of the electrodes 20, 22.

Furthermore, in the case of the welding gun 10A of the present embodiment, with a process of converting linear displacement of the output unit (piston rod 56) of the drive unit 14 into rotational displacement of the clamp arm 16, by the pressing action, i.e., the wedge action, of the inclined section 94 with respect to the pressed member 96, the driving force of the drive unit 14 is increased over roughly the entire region of the clamping force generating range. Consequently, since a small driving force of the drive unit 14 can produce the required clamping force, a small scale and lightweight drive unit 14 can be adopted. Thus, in accordance with the welding gun 10A, while having both functions of a clamping device and a welding device, a reduction in size and weight can also be realized.

The welding gun 10A is preferably applied to cases in which parts that are comparatively small in size and having a thin plate thickness (for example exhaust system components or the like) serve as workpieces W that are objects to be welded, and not to large scale component parts having a thick plate thickness such as a vehicle body frame or the like, of the automotive components. For example, in the case that a thin workpiece W having a plate thickness of 0.2 mm or less is used as the object to be welded, since the required clamping force and current ends up being comparatively small, in combination with the aforementioned advantages and effects by utilizing the wedge action of the inclined section 94, it is possible for the welding gun 10A to be made smaller in size and weight. Accordingly, for example, the total length of the welding gun 10A can be kept to 200 mm or less (preferably, 150 mm or less), and the weight thereof can be on the order of 1 kg or less to several kg, and thus the welding gun 10A can be handled by an operator without using a robot.

Second Embodiment

Figure 6:
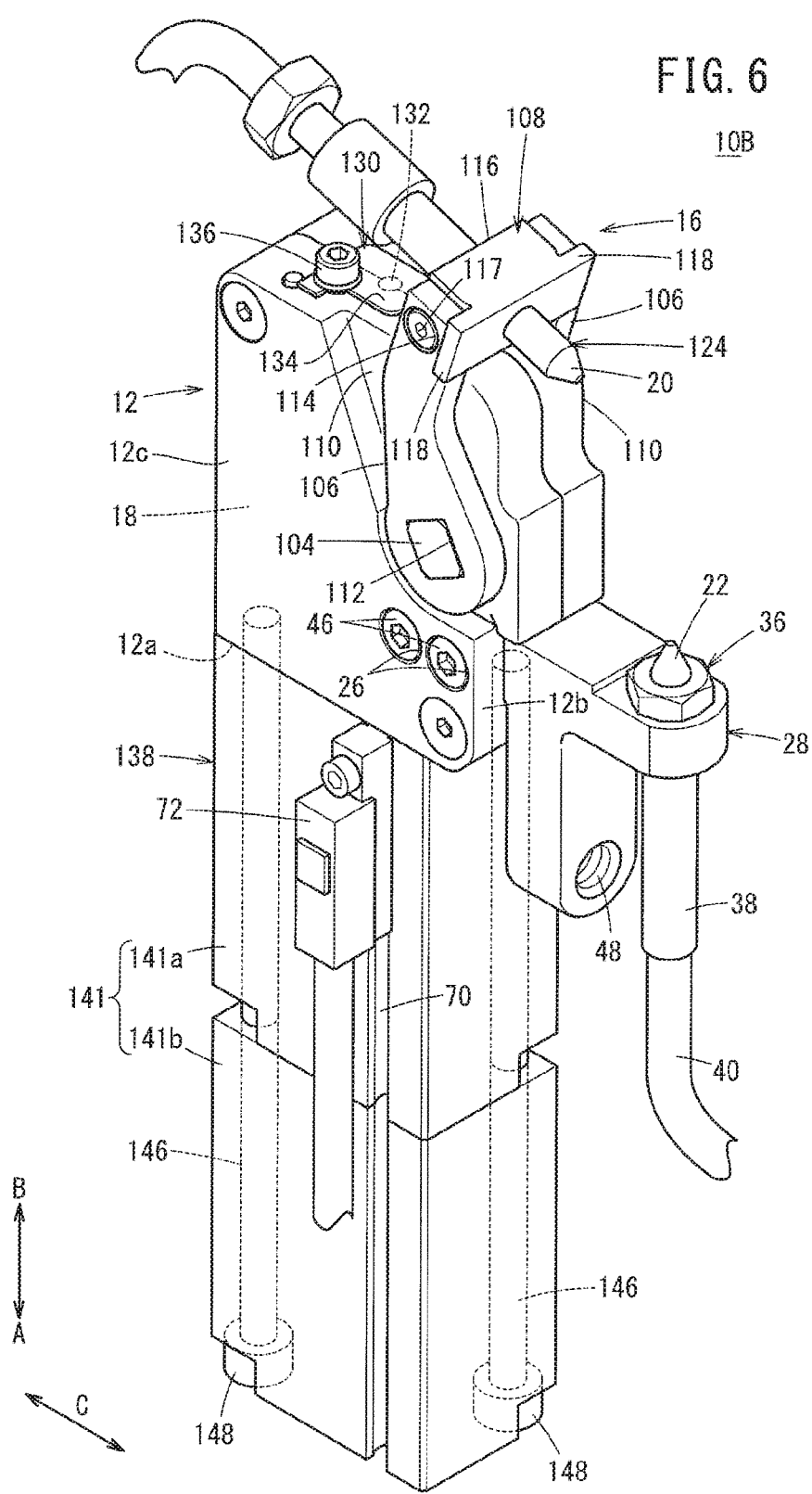
FIG. 6 is a perspective view of a welding gun according to a second embodiment of the present invention.
Figure 7:
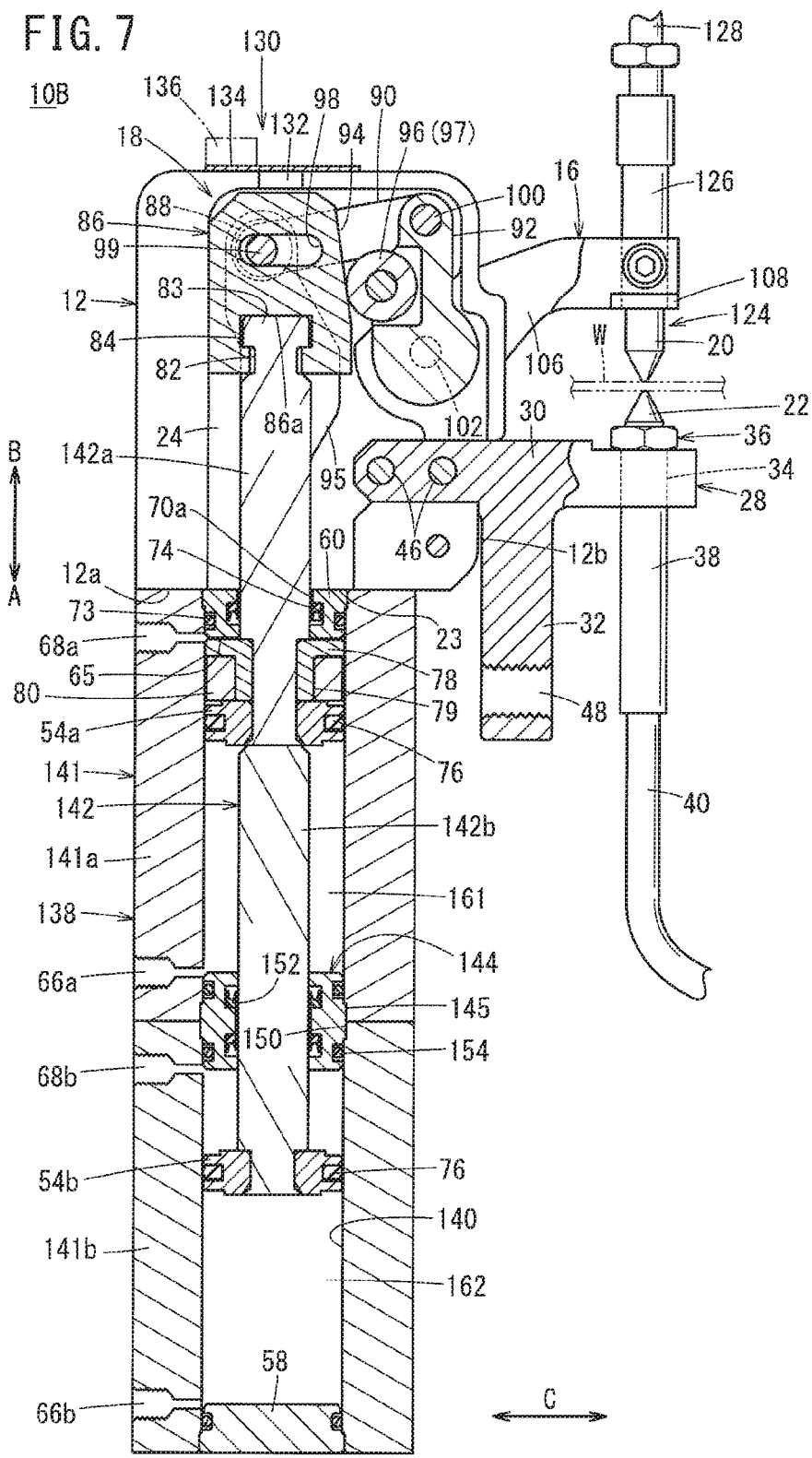
FIG. 7 is a partial cross-sectional view of the welding gun shown in FIG. 6.

FIG. 6 is a perspective view of a welding gun 10B according to a second embodiment of the present invention. FIG. 7 is a partial cross-sectional view of the welding gun 10B. In the second embodiment, components that are the same as those of the first embodiment are denoted commonly by the same reference characters, and duplicate descriptions of such features are omitted.

The welding gun 10B differs from the welding gun 10A equipped with a drive unit 14 having only one piston 54, in that the welding gun 10B comprises a drive unit 138 having a plurality of pistons 54 therein.

The drive unit 138 of the welding gun 10B includes a tubular shaped cylinder tube 141 in which a cylinder hole 140 is formed that penetrates in the axial direction (the direction of arrows A and B), a plurality of pistons 54 (a first piston 54a and a second piston 54b) which are disposed displaceably in the axial direction in the interior (the cylinder hole 140) of the cylinder tube 141, a piston rod 142 connected to the plural pistons 54, a rod cover 60 provided on one end of the cylinder hole 140 and which displaceably supports the piston rod 142, a cap 58 that closes in an airtight manner the other end of the cylinder hole 140, and a partition member 144 arranged in the cylinder hole 140 between the rod cover 60 and the cap 58.

One end of the cylinder tube 141 is disposed in abutment against an end surface of the body 12. As shown in FIG. 6, in the cylinder tube 141, a pair of through holes 146 are formed that penetrate in the axial direction. The drive unit 138 is connected with respect to the body 12 by screw-engagement of fastening bolts 148, which are inserted through the respective through holes 146, with respect to the body 12.

The cylinder tube 141 includes a hollow first tube 141a and a hollow second tube 141b that are connected in series in an axial direction. The aforementioned through holes 146 are formed to penetrate in the axial direction through the first tube 141a and the second tube 141b. The first tube 141a and the second tube 141b are connected and secured together by screw-engagement of the fastening bolts 148, which are inserted through the through holes 146, into the body 12, and by clamping the first tube 141a and the second tube 141b between head portions of the fastening bolts 148 and the body 12.

The rod cover 60 is disposed in an airtight manner in an end of the cylinder hole 140 on the side of the body 12 (an end of the first tube 141a on the side of the body 12). The cap 58 is disposed in an airtight manner in an end of the cylinder hole 140 on an opposite side from the body 12 (an end of the second tube 141b on an opposite side from the body 12).

The partition member 144 is arranged between the first tube 141a and the second tube 141b. More specifically, an annular projection 145 disposed on an outer circumferential part of the partition member 144 is engaged with an annular recess 150 formed on inner surfaces of connected ends of the first and second tubes 141a, 141b, whereby the partition member 144 is fixed with respect to the first tube 141a and the second tube 141b.

An inner circumferential side sealing ring 152 is mounted on an inner circumferential part of the partition member 144, and an outer circumferential side sealing ring 154 is mounted on an outer circumferential part of the partition member 144. Owing thereto, a gap between the outer circumferential part of the piston rod 142 (second rod 142b) and the inner circumferential part of the partition member 144, and a gap between the outer circumferential part of the partition member 144 and an inner circumferential part of the cylinder tube 141 are sealed respectively in an airtight manner.

In the cylinder hole 140, a first cylinder chamber 161 is formed between the rod cover 60 and the partition member 144, and a second cylinder chamber 162 is formed between the partition member 144 and the cap 58. The first piston 54a is disposed in the first cylinder chamber 161, and the second piston 54b is disposed in the second cylinder chamber 162.

Clamping ports 66a, 66b and unclamping ports 68a, 68b are formed on a side surface of the cylinder tube 141. One of the clamping ports 66a and one of the unclamping ports 68a communicate with the first cylinder chamber 161. The other of the clamping ports 66b and the other of the unclamping ports 68b communicate with the second cylinder chamber 162. The clamping ports 66a, 66b and the unclamping ports 68a, 68b are connected respectively through non-illustrated piping to a pressure fluid supply source.

During use of the welding gun 10B, a pressure fluid is supplied selectively from the non-illustrated pressure fluid supply source with respect to the clamping ports 66a, 66b or the unclamping ports 68a, 68b, and is introduced into the cylinder hole 140. More specifically, in order to perform clamping, the pressure fluid is supplied to the clamping ports 66a, 66b, and in order to perform unclamping, the pressure fluid is supplied to the unclamping ports 68a, 68b. It should be noted that unclamping can be performed by supplying the pressure fluid to only one of the two unclamping ports 68a, 68b.

The first piston 54a and the second piston 54b may be configured in the same manner as the piston 54 in the first embodiment.

The piston rod 142 includes a first rod 142a to which the first piston 54a is fixed, and a second rod 142b to which the second piston 54b is fixed. The first rod 142a and the second rod 142b are connected and secured together mutually by an appropriate fixing means (for example, a screw fitting or the like). The first piston 54a is fixed to an end of the first rod 142a, and the second piston 54b is fixed to an end of the second rod 142b.

In the welding gun 10B, which is constructed in the foregoing manner, in the case that switching is carried out from the unclamped state to the clamped state, by supplying a pressure fluid respectively to the clamping ports 66a, 66b, the first piston 54a and the second piston 54b are displaced toward the side of the body 12 (in the direction of the arrow B) integrally and simultaneously with the first rod 142a and the second rod 142b, and in comparison with the drive unit 14, which includes only a single piston 54, roughly two times the thrust force can be obtained, and along with the thrust force, the clamping force by the clamp arm 16 can be increased.

The thrust force may be increased by providing three or more pistons 54 and cylinder chambers at intervals in the axial direction.

In the second embodiment, concerning the respective constituent elements that are in common with those of the first embodiment, it is a matter of course that the same or similar operations and effects as the operations and effects possessed by the respective constituent elements that are in common with those of the first embodiment can be obtained.

Although preferred embodiments of the present invention have been presented above, the welding gun according to the present invention is not limited to such embodiments, and various changes and modifications can be made thereto without departing from the scope of the present invention as set forth in the appended claims.

The invention claimed is:

1. A welding gun comprising:

a body;

a clamp arm configured to be rotated with respect to the body;

a drive unit configured to drive the clamp arm, and having an output unit configured to be displaced linearly;

a driving force transmission mechanism configured to convert linear displacement of the output unit into rotational displacement of the clamp arm, and transmit a driving force of the drive unit to the clamp arm;

a first electrode fixed to the clamp arm; and a second electrode configured to grip a workpiece between the first electrode and the second electrode;

wherein the driving force transmission mechanism includes:

an inclined section configured to be displaced integrally with linear displacement of the output unit, the inclined section being inclined with respect to a displacement direction of the output unit; and a pressed member configured to be pressed by the inclined section;

wherein the clamp arm rotates accompanying movement of the pressed member, which is pressed by the inclined section during displacement of the inclined section, and generates a clamping force, wherein the driving force transmission mechanism further includes:

a joint, which is connected to the output unit and has the inclined section formed thereon; and a link arm configured to be displaced in a direction that intersects the displacement direction of the output unit, the link arm being supported rotatably with respect to the joint;

wherein operations of the welding gun include a first operation by which linear displacement of the joint is converted into rotational displacement of the clamp arm through the link arm, and is transmitted, and a second operation by which linear displacement of the joint is converted into rotational displacement of the clamp arm through the inclined section and the pressed member, and is transmitted.

2. The welding gun according to claim 1, wherein:

the output unit is a piston rod; and the drive unit includes a plurality of pistons that are fixed on the piston rod and arranged at intervals therebetween in an axial direction of the piston rod.

* * * * *